J. H. NICHOLS.
Gate-Fasteners.
No. 145,362.
Patented Dec. 9, 1873.
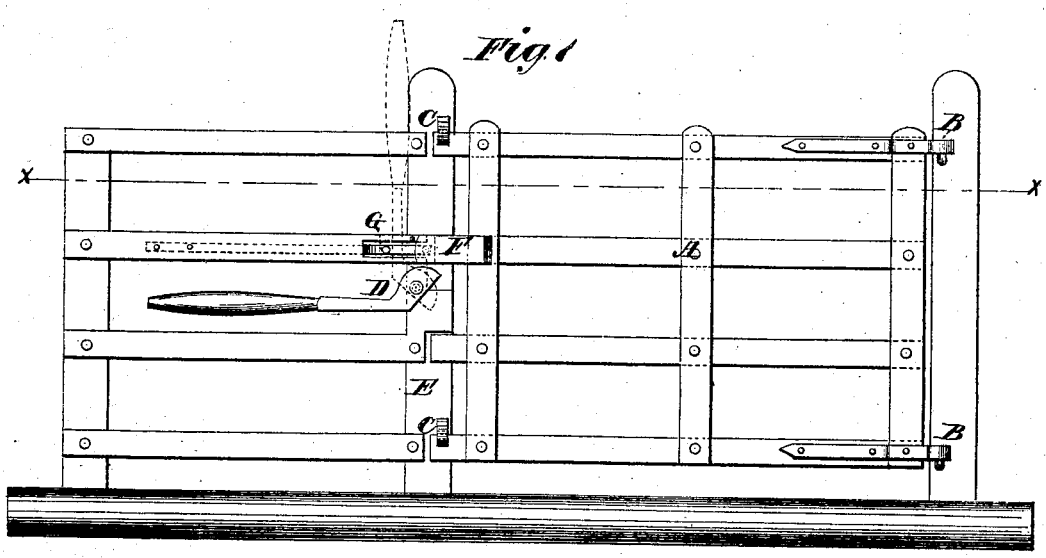
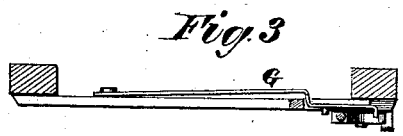
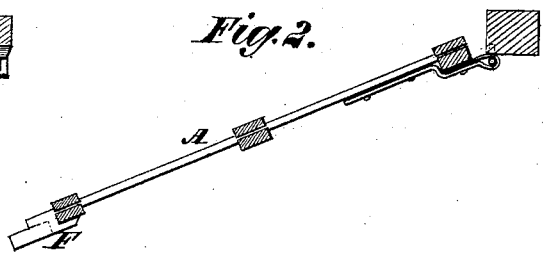
WITNESSES:
INVENTOR:
J. H. Nichols,
BY
ATTORNEYS.

UNITED STATES PATENT OFFICE.

JOSEPH H. NICHOLS, OF LA FAYETTE, ILLINOIS.

IMPROVEMENT IN GATE-FASTENERS.

Specification forming part of Letters Patent No. 145,362, dated December 9, 1873; application filed October 25, 1873.

*To all whom it may concern:*

Be it known that I, JOSEPH H. NICHOLS, of La Fayette, in the county of Stark and State of Illinois, have invented a new and Improved Gate-Fastening, of which the following is a specification:

My invention relates to the class of gate-fastenings so contrived that the gate closes under the catches, and is then lifted up into them and held by a suitable arrangement of levers. I employ a weighted eccentric lever, which effectually secures the gate while it remains down, and only releases it on being lifted up, as hereinafter described.

Figure 1 is a front elevation of a gate arranged according to my improvement. Figs. 2 and 3 represent a horizontal section of the gate and fence taken on the line $x$ $x$ of Fig. 1.

Similar letters of reference indicate corresponding parts.

A represents the gate, which is arranged on its hinges B, so that it can rise and fall slightly in its vertical plane; also, so that it closes under the catches C, which are notched in the under side to receive the ends of the bars of the gate for fastening it. D represents the weighted eccentric lever, which is pivoted to the post E, against which the gate shuts, so that after the gate closes the lever will, by swinging down by the side of the fence, raise the gate into the notches of the catches C, by acting on the projection F, as clearly indicated in the drawing, and it will unfasten the gate by letting it fall out of the notches when it is lifted up into the position indicated by dotted lines. G is the spring-catch for holding the lever up. It is pushed back by hand to engage the lever and disengage it.

Having thus described my invention, I claim as new and desire to secure by Letters Patent—

The combination of the weighted lever D with post E, catches C, and the gate A having piece F and projections to take under said catches, as shown and described, to operate as specified.

JOSEPH H. NICHOLS.

Witnesses:
 THEO. D. RIDGWAY,
 E. G. HILL.